(12) United States Patent
Kim

(10) Patent No.: US 7,773,781 B2
(45) Date of Patent: Aug. 10, 2010

(54) FACE DETECTION METHOD AND APPARATUS AND SECURITY SYSTEM EMPLOYING THE SAME

(75) Inventor: Jungbae Kim, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1246 days.

(21) Appl. No.: 10/972,381

(22) Filed: Oct. 26, 2004

(65) Prior Publication Data

US 2005/0094854 A1    May 5, 2005

(30) Foreign Application Priority Data

Oct. 31, 2003    (KR) .................. 10-2003-0077040

(51) Int. Cl.
*G06K 9/00* (2006.01)
(52) U.S. Cl. ..................................... 382/118
(58) Field of Classification Search ........... None
See application file for complete search history.

(56) References Cited

U.S. PATENT DOCUMENTS

| | | | | |
|---|---|---|---|---|
| 7,035,456 B2* | 4/2006 | Lestideau | .................. | 382/164 |
| 7,050,607 B2* | 5/2006 | Li et al. | ...................... | 382/118 |
| 7,099,510 B2* | 8/2006 | Jones et al. | .................. | 382/225 |
| 2001/0046309 A1* | 11/2001 | Kamei | ........................ | 382/103 |
| 2001/0053292 A1* | 12/2001 | Nakamura | .................. | 396/661 |
| 2002/0159627 A1* | 10/2002 | Schneiderman et al. | ..... | 382/154 |
| 2003/0071908 A1* | 4/2003 | Sannoh et al. | ............. | 348/345 |
| 2004/0240708 A1* | 12/2004 | Hu et al. | ..................... | 382/103 |

FOREIGN PATENT DOCUMENTS

| KR | 10-2001-0088921 | 9/2001 |
|---|---|---|
| KR | 10-2003-0006539 | 1/2003 |

OTHER PUBLICATIONS

Korean Office Action dated Oct. 31, 2005 for Korean App. No. 10-2003-0077040.

* cited by examiner

*Primary Examiner*—Vikkram Bali
*Assistant Examiner*—Elisa M Rice
(74) *Attorney, Agent, or Firm*—Staas & Halsey LLP

(57) ABSTRACT

A face detection method and apparatus and a security system employing the same. The face detection method includes: determining whether or not a face is detected in a previous frame image; if a face is not detected in the previous frame image, detecting a face in a first image according to one detection mode selected from N face detection modes, where N is an integer equal to or greater than 2; and if a face is detected in the previous frame image, detecting a face by performing sequentially at least one tracking mode of N face tracking modes with a second image.

26 Claims, 14 Drawing Sheets

FACE DETECTION METHOD AND APPARATUS AND SECURITY SYSTEM EMPLOYING THE SAME

CROSS-REFERENCE TO RELATED APPLICATIONS

This application claims the priority of Korean Patent Application No. 2003-77040, filed on Oct. 31, 2003 in the Korean Intellectual Property Office, the disclosure of which is incorporated herein in its entirety by reference.

BACKGROUND OF THE INVENTION

1. Field of the Invention

The present invention relates to face detection, and more particularly, to a face detection method and apparatus by which a face is detected accurately in real-time according to whether or not a face is detected in a previous frame image, by applying any one of a face detection mode and a face tracking mode to a current frame image, and a security monitoring system using the same.

2. Description of the Related Art

Face detection technology, which is an important component of facial recognition systems, is becoming more important as a variety of applications have been being introduced recently, including human-computer interface, video monitoring systems, and face-based image retrieval. Though a lot of research activities on face detection technologies have been performed, the reliability of algorithms is still not high enough to be applied to practical life and the detection speed is not satisfactory.

To solve the aforementioned problems, research on a method using a decision boundary, determined after training from face sample patterns, is being carried out. Representative methods in this category include multi layer perceptron (MLP) and support vector machine (SVM). The conventional MLP uses a local receptive field to apply to a face image and another conventional method projects an image pattern on a plurality of principle component analysis (PCA) subspaces and uses distances to a subspace as an MLP input. However, since the learning method through MLP only minimizes errors from given sample data, the method operates well for trained data but successful operations for new data that has not been trained cannot be guaranteed. In particular, considering various changes that occur with a face image according to factors, such as illumination, facial expressions, and poses, the reliability of the methods based on MLP is low if the number of data samples is very big.

Meanwhile, SVM can minimize errors of given data and at the same time maximize the margin of the entire facial recognition system such that the capability of the SVM generalizing a new pattern is superior to the MLP. In the conventional SVM technology, the SVM is applied to a face image without change and a face detection result with some degree of reliability is obtained. However, the SVM is not satisfactory for application to practical life or real world situations. In another conventional SVM technology, without using a face image as a whole, features of the face image are extracted through independent component analysis (ICA), and by applying the SVM, the reliability of face detection is improved to a small degree. However, this conventional technology generally uses nonlinear SVM in order to obtain a reliable face detection performance and this requires enormous amounts of computation such that the processing speed of the algorithm is slow.

Besides, the face detection apparatus applied to the conventional security monitoring systems can detect only a face rotated by a narrow angle roughly from −10 degrees to +10 degrees. However, in the image of a user approaching a security monitoring system such as a cash dispenser, face rotations of a large angle at at least one of the x, y and z axes are common and therefore, if the rotation angle is larger than a detectable rotation range, it is difficult for the system to detect a face. In addition, in the security monitoring system, face images of multiple channels by a plurality of cameras should be stored and a face detection speed of 15 frames or more per second is required. However, according to the conventional face detection technology to date, the maximum speed is only about 5 frames per second. When a face is detected by using skin color information, it is difficult to deal with an illumination change and when part of a face is covered by a hand, a mask or sunglasses, the face detection rate is greatly lowered.

SUMMARY OF THE INVENTION

According to an aspect of the present invention, a method and apparatus which detects a face accurately in real time according to whether or not a face is detected in the previous frame image, by applying any one of a face detection mode and a face tracking mode to a current frame image is provided.

According to another aspect, the present invention also provides a method and apparatus by which in addition to a frontal face image, a face image rotated by a large angle, and a partially covered face image can be detected accurately in real-time.

In an aspect of the present invention a security monitoring system employing the face detection apparatus is provided.

According to an aspect of the present invention, there is provided a face detection method including: determining whether or not a face is detected in a previous frame image; if a face is not detected in the previous frame image, detecting a face in a first image according to one detection mode selected from N face detection modes, where N is an integer equal to or greater than 2; and if a face is detected in the previous frame image, detecting a face by performing sequentially at least one tracking mode of N face tracking modes with a second image.

According to another aspect of the present invention, there is provided a face detection apparatus including: a face detection module which detects a face by selectively performing one of N face detection modes, where N is an integer equal to or greater than 2 on a first image; a face tracking module which detects a face by sequentially performing at least one of N face tracking mode with a second image; a determination unit which receives the output of the face detection module or the output of the face tracking module as an input and determines whether or not a face is detected in the previous frame image; and a switching unit which according to the determination result of the determination unit, provides the first image to any one of the face detection module and the face tracking module.

According to another aspect of the present invention, there is provided a security monitoring system including: an image pickup apparatus which picks up an image of an object and converts the image into a gray scale image; a face detection apparatus which if a face is not detected in the previous frame image provided by the image pickup apparatus, selects one of N face detection modes, where N is an integer equal to or greater than 2 and detects a face in a current frame image, and if a face is detected in the previous frame image, detects a face by performing sequentially at least one N face tracking mode with an image obtained by restricting the current frame image to a predetermined size in consideration of the size of the face detected in the previous frame image; and a storage apparatus which stores face images detected in the face detection apparatus in units of frames.

In an aspect of the present invention, the method can be implemented as a computer program by a computer readable recording medium executing the method in a computer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
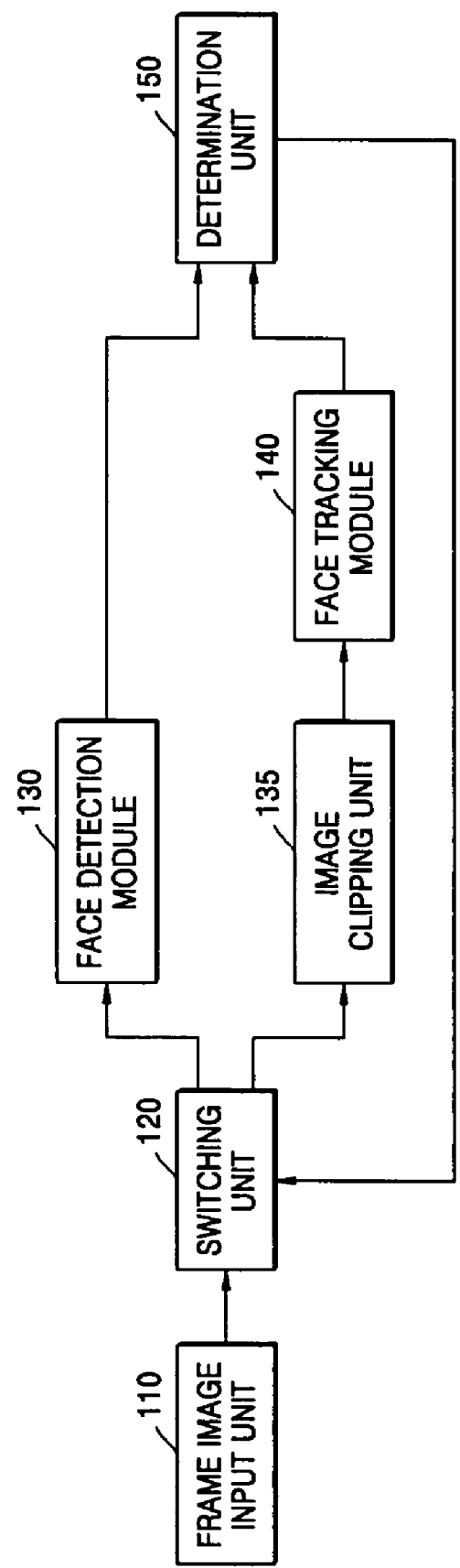
FIG. 1 is a block diagram showing the structure of an embodiment of a face detection apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
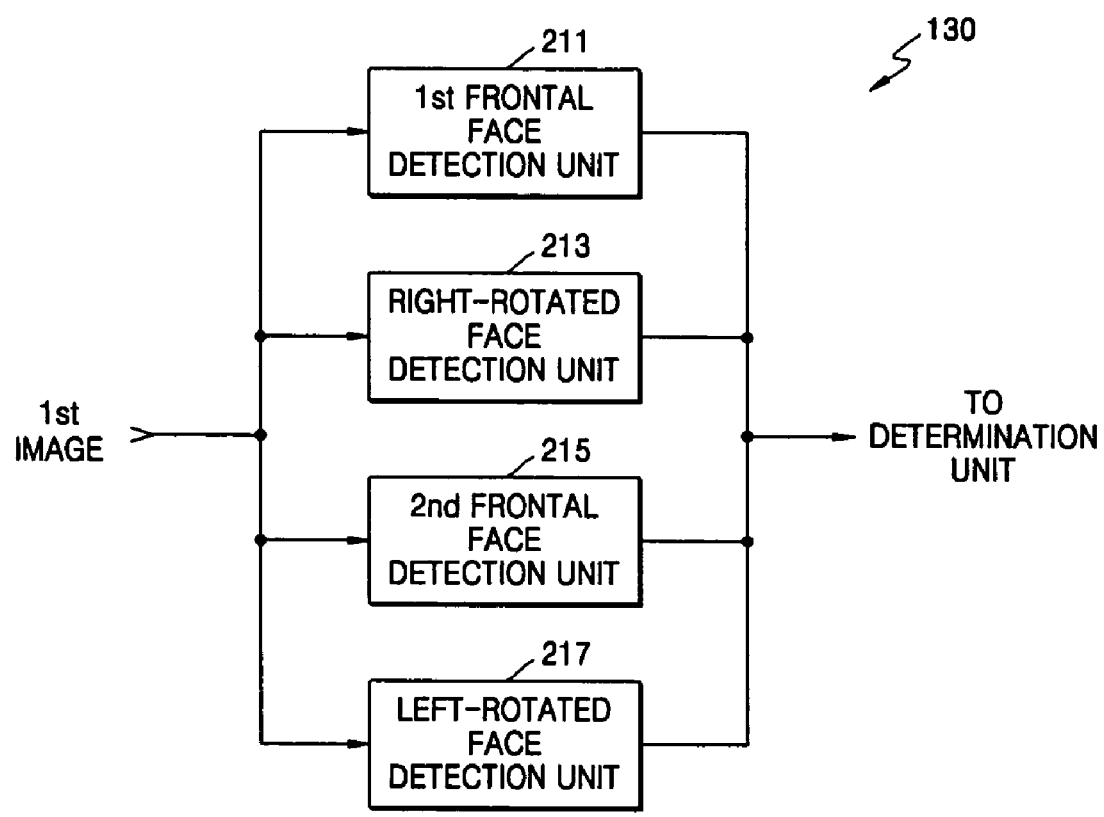
FIG. 2 is a block diagram showing a detailed structure of the face detection module of FIG. 1.
Figure 3:
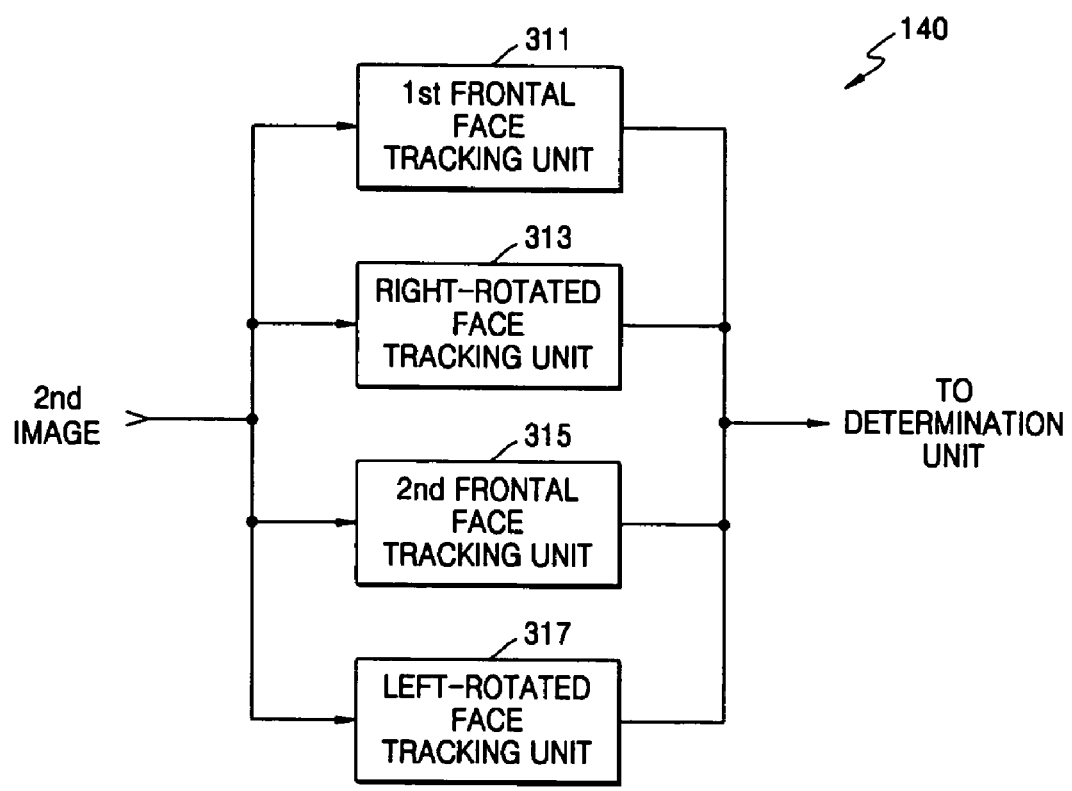
FIG. 3 is a block diagram showing a detailed structure of the face tracking module of FIG. 1.

Referring to FIG. 1, a face detection apparatus according to an embodiment of the present invention includes a frame image input unit 110, a switching unit 120, a face detection module 130, an image clipping unit 135, a face tracking module 140, and a determination unit 150. The face detection module 130 has four face detection modes as shown in FIG. 2, and is formed with a first frontal face detection unit 211, a right-rotated face detection unit 213, a second frontal face detection unit 215, and a left-rotated face detection unit 217. The face tracking module 140 has four face tracking modes as shown in FIG. 3, and is formed with a first frontal face tracking unit 311, a right-rotated face tracking unit 313, a second frontal face tracking unit 315, and a left-rotated face tracking unit 317. Operation of the face detection apparatus shown in FIG. 1 will now be explained with reference to FIGS. 1, 2 and 3.

Referring to FIG. 1, the frame image input unit 110 sequentially provides input images to the switching unit 120 in each frame. In accordance with a result of a determination of whether or not a face is detected in the determination unit 150, the switching unit 120 provides the frame images from the frame image input unit 110, to the face detection module 130 or the face tracking module 140. That is, if the result of the determination of the determination unit 150 indicates that a face is not detected in an n-th frame image (i.e., a previous frame image), the (n+1)-th frame image (i.e., a current frame image) is provided to the face detection module 130, and if a face is detected in the n-th frame image, the (n+1)-th frame image is provided to the face tracking module 140.

When a face is not detected in the n-th frame image in the face detection module 130 or the face tracking module 140, the face detection module 130 checks for or detects a face in a first image that is the (n+1)-th frame image provided by the frame image input unit 110 through the switching unit 120. Here, an example of the first image that is a gray scale image of 320×240 pixels will now be explained.

Referring to FIG. 2, in the face detection module 130, the first and second frontal face detection units 211 and 215, respectively, detect a face in the first image (e.g., the current frame image). The first frontal face detection unit 211 has a large number of stages connected in the form of a cascade, for example, 20 to 30 stages, such that the accuracy of detection is high but the speed of detection is slow. The second frontal face detection unit 215 has a small number of stages connected in the form of a cascade, for example, 10 to 20 stages, such that the accuracy of detection is low but the speed of detection is fast.

The right-rotated face detection unit 213 rotates the first image to the right by a predetermined angle and then detects a face, while the left-rotated face detection unit 217 rotates the first image to the left by a predetermined angle and then detects a face. The angles to rotate a frame image in the right-rotated face detection unit 213 and the left-rotated face detection unit 217 are in a range, for example, between approximately 20° and 30°, and preferably, 25°.

When a face is not detected in the n-th frame image, the (n+1)-th frame image is selectively provided to any one of the four face detection units 211 through 217 in the face detection module 130 according to a remainder obtained by dividing the number of frames in which a face is not detected previously, by 4. For example, when the remainder is 0, 1, 2, and 3, the (n+1)-th frame image is provided to the first frontal face detection unit 211, the right-rotated face detection unit 213, the second frontal face detection unit 215, and the left-rotated face detection unit 217, respectively. The arrangement is not restricted to this one, and can be made in a variety of orders according to the required accuracy and speed of detection, and when necessary, a part of the arrangement can be omitted.

When a face is detected in the n-th frame image in either the face detection module 130 or the face tracking module 140, the face tracking module 140 detects a face in a second image that is the (n+1)-th frame image provided by the frame image input unit 110 through the switching unit 120. The second image is obtained by clipping the first or (n+1)-th image. Here, the second image is obtained by restricting the size of the (n+1)-th frame image, for example, to 100×100 pixels in consideration of the location of a face in the n-th frame image in which the face is detected. This size restriction is performed in an image clipping unit 135. The box coordinates of the location of the face in the n-th frame image in which the face is detected are stored in the face detection determination unit 150. In the image clipping unit 135, the size of the (n+1)-th frame image is clipped to include the box coordinates of the location of the face in the n-th frame image, and then face detection in the face tracking module 140 is performed.

In the face tracking module 140, the first and second frontal face tracking units 311 and 315, respectively, detect a face in the second image. The first frontal face tracking unit 311 has a large number of stages, for example, 20 to 30 stages, connected in the form of a cascade such that the accuracy of detection is high but the speed of detection is slow. The second frontal face tracking unit 315 has a small number of stages, 10 to 20 stages, connected in the form of a cascade such that the accuracy of detection is low but the speed of detection is fast. This will be explained in more detail below referring to FIG. 9.

The right-rotated face tracking unit 313 rotates the second image to the right by a predetermined angle and then detects a face, while the left-rotated face tracking unit 317 rotates the second image to the left by a predetermined angle and then detects a face. The angles to rotate a frame image in the right-rotated face tracking unit 313 and the left-rotated face tracking unit 317 are in a range, for example, between approximately 20° and 30°, and preferably, 25°.

The determination unit 150 receives, as inputs, the results of face detection in the n-th frame image in each of the face detection units 211 through 217 of the face detection module 130 or in each of the face tracking units 311 through 317 of the face tracking module 140. Then, the determination unit 150 updates the number of frames ($C_{non\_det}$) in which a face is not detected previously, and determines whether the (n+1)-th frame image is provided to the face detection module 130 or the face tracking module 140. That is, when a face is not detected in the n-th frame image, the (n+1)-th frame image is provided to the face detection module 130. When a face is detected in the n-th frame image, the (n+1)-th frame image is provided to the face tracking module 140 through the image clipping unit 135. In addition, when a face is detected in the n-th frame image in either the face detection module 130 or the face tracking module 140, the face detection determination unit 150 stores the box coordinates of the location of the face, and provides the box coordinates to the image clipping unit 135 through the switching unit 120 so that the coordinates can be used as a reference to extract the second image.

Figure 4:
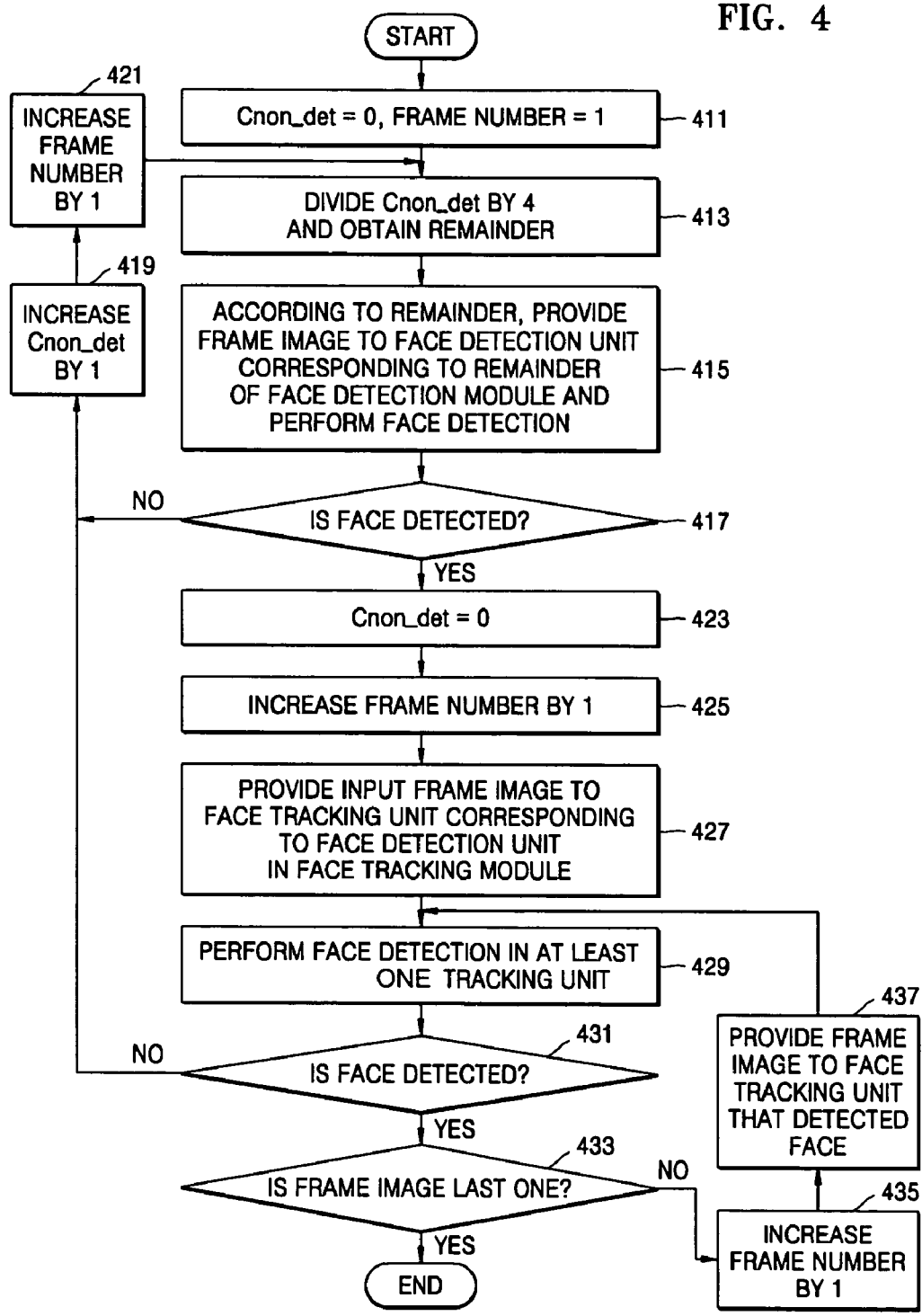
FIG. 4 is a flowchart of operations performed by an embodiment of a face detection method.

FIG. 4 is a flowchart of operations performed by an embodiment of a face detection method according to the present invention, and the method will now be explained with reference to FIGS. 1 through 4.

Referring to FIG. 4, in operation 411 for initialization, the number of frames ($C_{non\_det}$) in which a face is not detected previously is set to 0 and the frame number (n) is set to 1. In operation 413, in order to determine whether a first image, that is an n-th frame image, is provided to the first frontal face detection unit 211, the right-rotated face detection unit 213, the second frontal face detection unit 215, or the left-rotated face detection unit 217 of the face detection module 130, the number of frames ($C_{non\_det}$) in which a face is not detected previously is divided by a dividend, for example, 4, and the remainder is obtained. The value of the remainder (i.e., 0, 1, 2, or 3) determines a corresponding one of the face detection units 211, 213, 215 or 217 checks for the face in the n-th frame image. Here, the dividend is a value determined according to the number of face detection units forming the face detection module 130.

In operation 415, according to the remainder calculated in operation 413, the n-th frame image is provided to one of the face detection units of the face detection module 130 corresponding to the remainder, and face detection is performed. For example, when the remainder is 0, 1, 2, and 3, the n-th frame image is provided to the first frontal face detection unit 211, the right-rotated face detection unit 213, the second frontal face detection unit 215, and the left-rotated face detection unit 217, respectively. Each face detection unit 211 through 217 detects a face by using a simple feature and stages connected in the form of a cascade, which will be explained in more detail below.

In operation 417, it is determined whether or not a face is detected as a result of performing face detection in operation 415. If the result of the determination in operation 417 indicates that a face is not detected, the number of frames ($C_{non\_det}$) in which a face is not detected previously is increased by 1 in operation 419, the frame number (n) is increased by 1 in operation 421, and operation 413 is performed again to try to detect a face in the (n+1)-th frame image. Meanwhile, if the result of the determination in operation 417 indicates that a face is detected, the number of frames ($C_{non\_det}$) in which a face is not detected previously is reset to 0 in operation 423, and in operation 425, the frame number is increased by 1 and a next frame image is received (i.e., the (n+1)-th). In operation 423, the box coordinates of the location of a face detected in the n-th frame image are stored in a memory and used as a reference by the image clipping unit 135 to extract a second image in the (n+1)-th frame image.

In operation 427, a second image obtained by restricting the input (n+1)-th frame image to a predetermined size to include the location of the face detected in the n-th frame image is provided to the face tracking module 140. At this time, among the face tracking units 311, 313, 315 and 317 of the face tracking module 140, the (n+1)-th frame image is provided to a face tracking unit corresponding to the face detection unit which detected the face in the n-th frame image. In operation 429, face detection of the second image of the input (n+1)-th frame image is performed in at least one face tracking unit, and this will be explained in more detail below with reference to FIGS. 5 through 8.

In operation 431, if a face is not detected as a result of performing face detection in operation 429, the number of frames ($C_{non\_det}$) in which a face is not detected previously is increased by 1 in operation 419, the frame number (n) is increased by 1 in operation 421, and operation 413 is performed again to try to detect a face in the (n+2)-th frame image. Meanwhile, if the result of the determination in operation 431 indicates that a face is detected, it is determined in operation 433 whether or not the (n+1)-th frame provided in operation 427 is the last frame image, and if it is the last frame image, the operations of the flowchart shown in FIG. 4 are finished.

If the result of the determination in operation 433 indicates that the (n+1)-th frame image is not the last frame, the frame number is increased by 1 in operation 435, the (n+2)-th frame image is provided to the face tracking module 140 and operation 429 is performed again. At this time, the (n+2)-th frame image is provided to the face tracking unit that detected a face in the (n+1)-th frame image, among the face tracking units 311, 313, 315 and 317 of the face tracking module 140.

Figure 5:
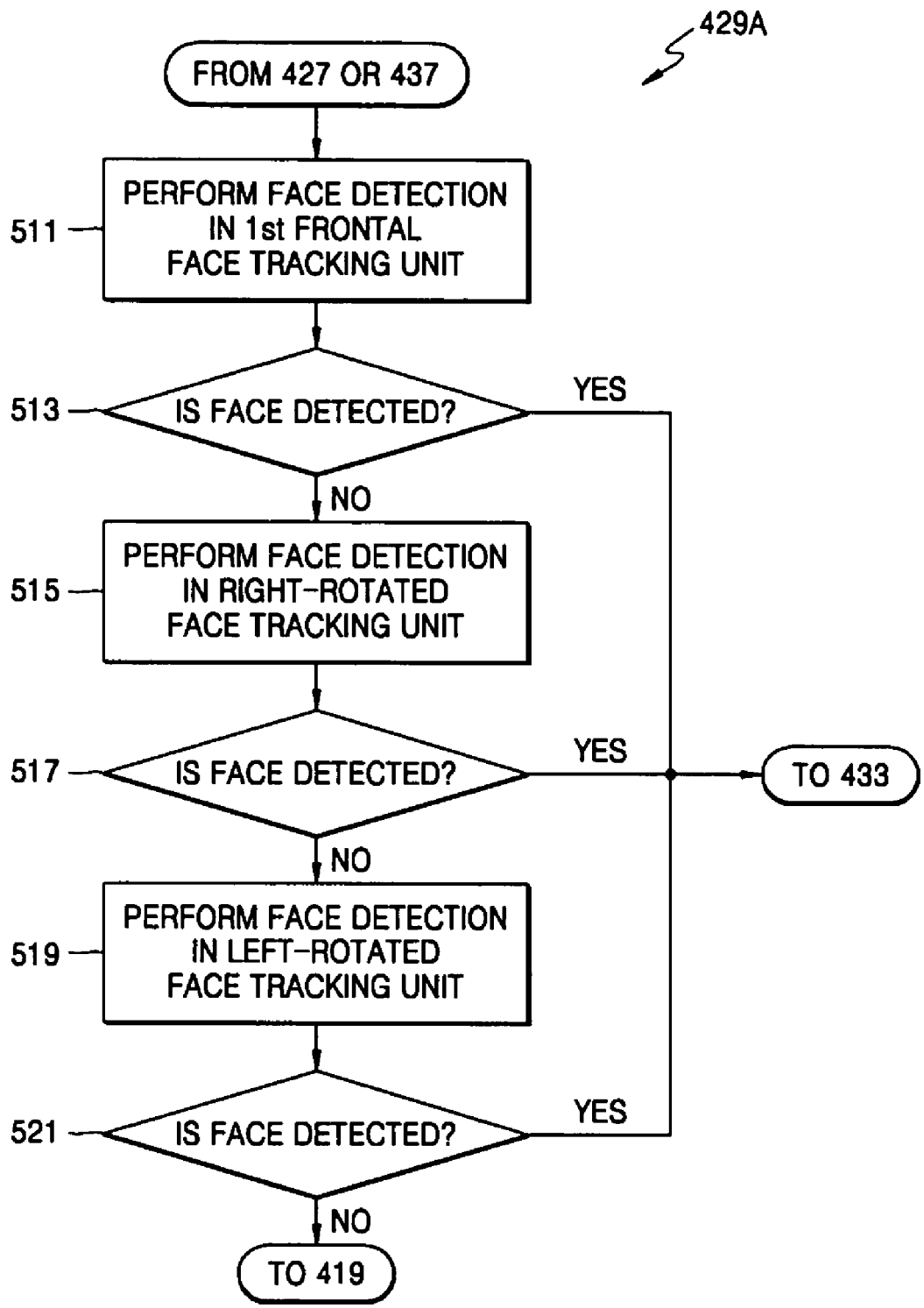
FIG. 5 is a flowchart explaining operation when a face is detected in a first frontal face detection unit in operation 429 of FIG. 4.
Figure 6:
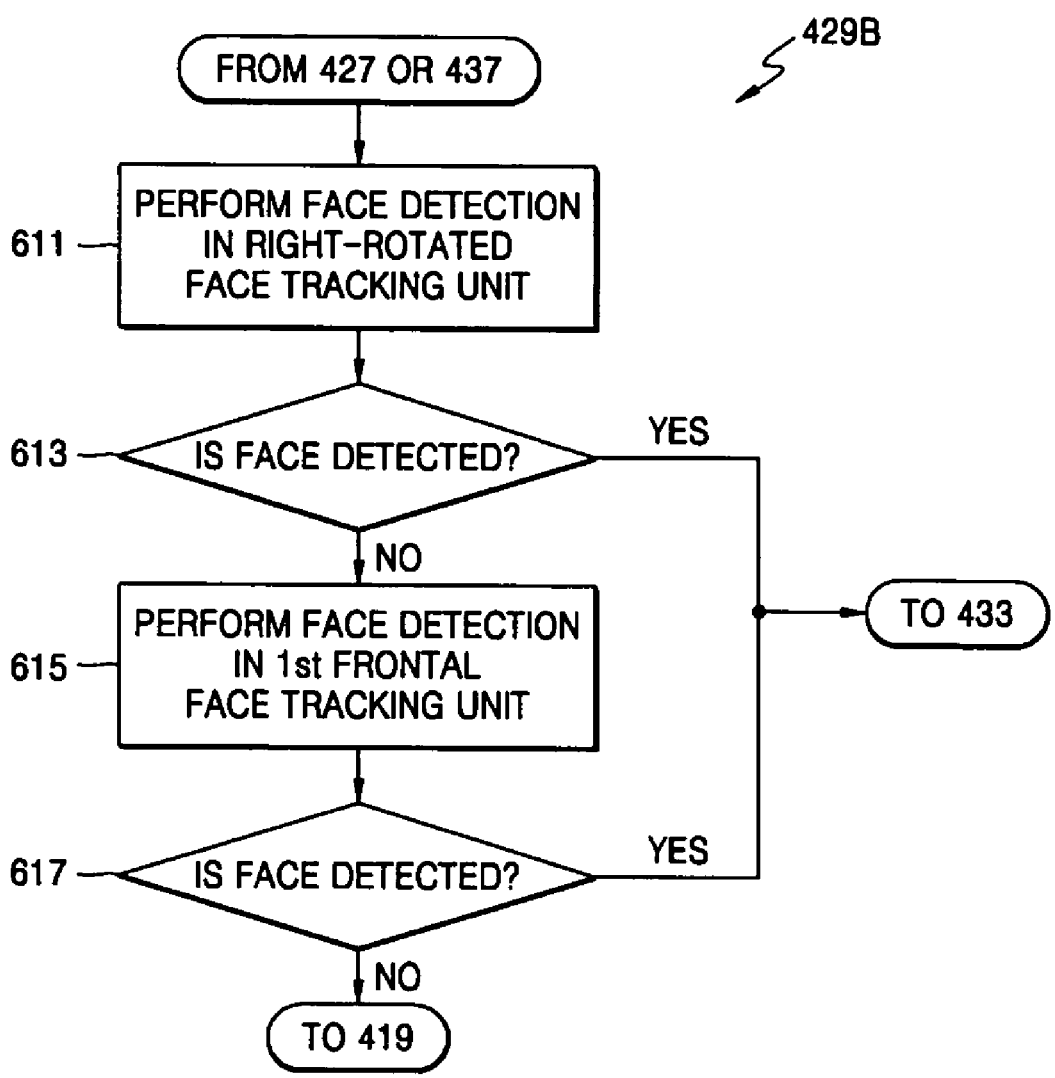
FIG. 6 is a flowchart explaining operation when a face is detected in a right-rotated face detection unit in operation 429 of FIG. 4.
Figure 7:
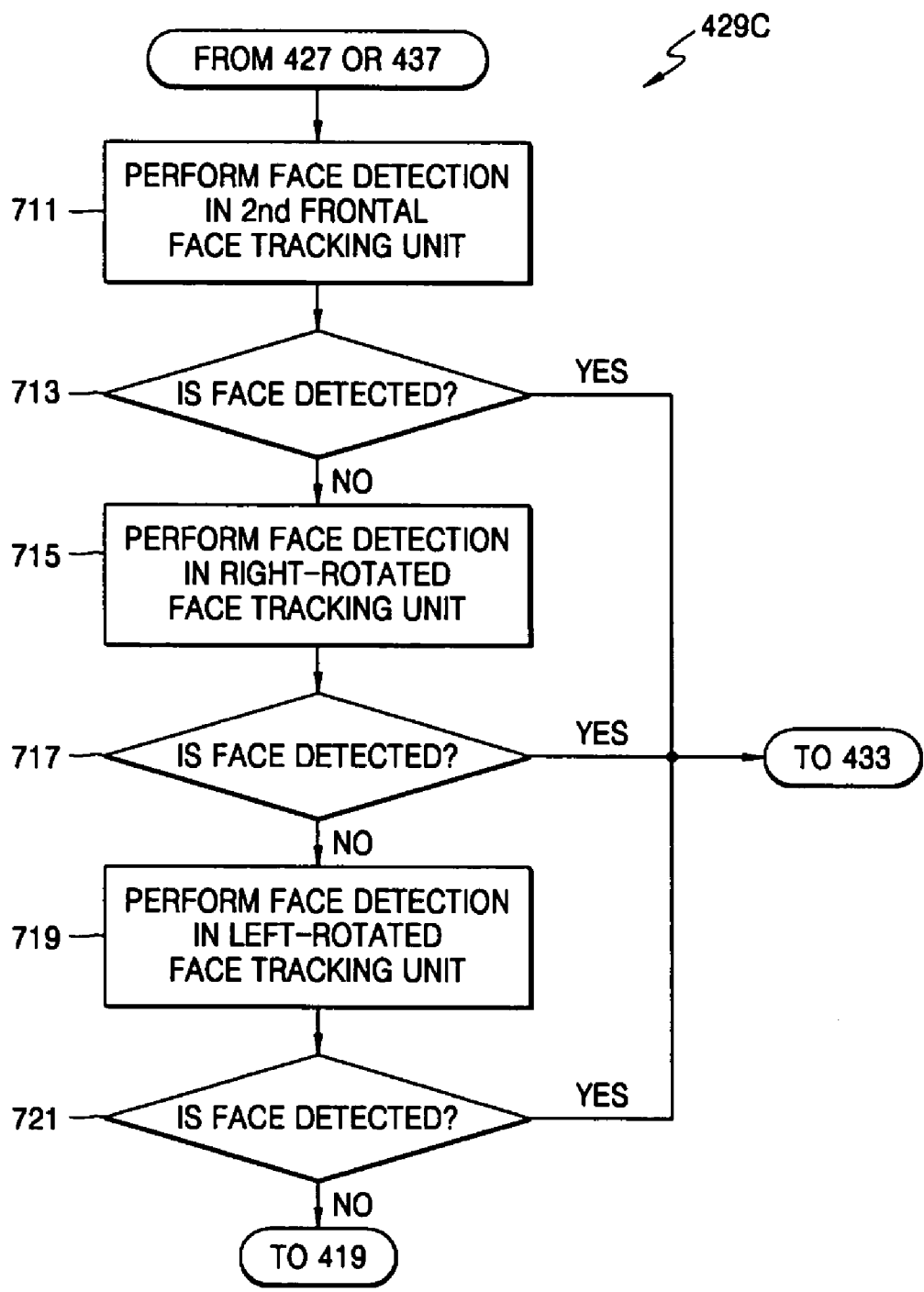
FIG. 7 is a flowchart explaining operation when a face is detected in a second frontal face detection unit in operation 429 of FIG. 4.
Figure 8:
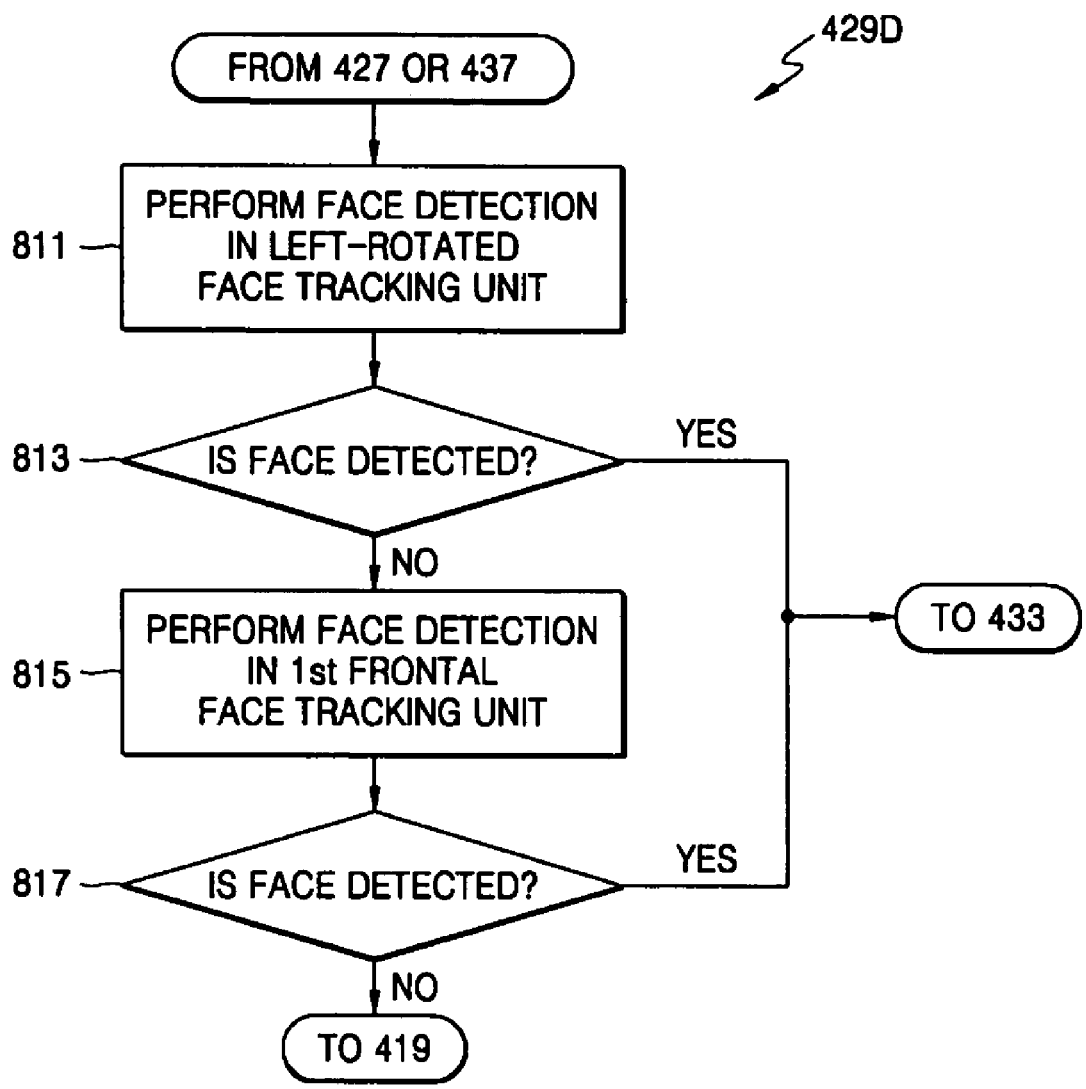
FIG. 8 is a flowchart explaining operation when a face is detected in a left-rotated face detection unit in operation 429 of FIG. 4.

FIGS. 5 through 8 are flowcharts explaining detailed operations of operation 429 and 431 of FIG. 4. FIG. 5 shows a case 429A where a face is detected in the previous frame image by the first frontal face detection unit 211 or the first frontal face tracking unit 311. FIG. 6 shows a case 429B where a face is detected in the previous frame image by the right-rotated face detection unit 213 or the right-rotated face tracking unit 313. FIG. 7 shows a case 429C where a face is detected in the previous frame image by the second frontal face detection unit 215 or the second frontal face tracking unit 315. FIG. 8 shows a case 429D where a face is detected in the previous frame image by the left-rotated face detection unit 217 or the left-rotated face tracking unit 317.

Referring to FIG. 5, if face detection in the previous frame image by the first frontal face detection unit 211 or the first frontal face tracking unit 311 is successful in operation 427 or 437 of FIG. 4, the second image of the current frame image is provided to the first frontal face tracking unit 311 and face detection is performed in operation 511. In operation 513, it is determined whether or not face detection in the second image of the current frame image by the first frontal face tracking unit 311 is successful, and if the face detection is successful, operation 433 of FIG. 4 is performed. If the result of the determination in operation 513 indicates that the face detection is not successful, the second image of the current frame image is provided to the right-rotated face tracking unit 313 and face detection is performed in operation 515. In operation 517, it is determined whether or not face detection in the second image of the current frame image by the right-rotated face tracking unit 313 is successful. If the face detection is successful, operation 433 of FIG. 4 is performed. If the result of determination in operation 517 indicates that the face detection is not successful, the second image of the current frame image is provided to the left-rotated face tracking unit 317 and face detection is performed in operation 519. In operation 521, it is determined whether or not face detection in the second image of the current frame image by the left-rotated face tracking unit 317 is successful. If the face detection is successful in operation 521, operation 433 of FIG. 4 is performed, and if the face detection is not successful in operation 521, then operation 419 of FIG. 4 is performed.

Referring to FIG. 6, if face detection in the previous frame image by the right-rotated face detection unit 213 or the right-rotated face tracking unit 313 is successful in operation 427 or 437 of FIG. 4, the second image of the current frame image is provided to the right-rotated face tracking unit 313 and face detection is performed in operation 611. In operation 613, if a face is detected by the right-rotated face tracking unit 313 in operation 611, then, operation 433 of FIG. 4 is performed. If the result of the determination in operation 613 indicates that the face detection is not successful, the second image of the current frame image is provided to the first frontal face tracking unit 311 and face detection is performed in operation 615. In operation 617 it is determined whether or not face detection in the second image of the current frame image by the first frontal face tracking unit 311 is successful. If the face detection is successful, operation 433 of FIG. 4 is performed, and if the face detection is not successful, then operation 419 of FIG. 4 is performed.

Referring to FIG. 7, if face detection in the previous frame image by the second frontal face detection unit 215 or the second frontal face tracking unit 315 is successful in operation 427 or 437 of FIG. 4, the second image of the current frame image is provided to the second frontal face tracking unit 315 and face detection is performed in operation 711. In operation 713, whether or not face detection in the second image of the current frame image by the second frontal face tracking unit 315 is successful is determined. If the face detection is successful in operation 713, then operation 433 of FIG. 4 is performed. If the result of the determination in operation 713 indicates that the face detection is not successful, the second image of the current frame image is provided to the right-rotated face tracking unit 313 and face detection is performed in operation 715. In operation 717, whether or not face detection in the second image of the current frame image by the right-rotated face tracking unit 313 is successful is determined. If the face detection is successful in operation 717, operation 433 of FIG. 4 is performed. If the result of the determination in operation 717 indicates that the face detection is not successful, the second image of the current frame image is provided to the left-rotated face tracking unit 317 and face detection is performed in operation 719. In operation 721, whether or not face detection in the second image of the current frame image by the left-rotated face tracking unit 317 is successful in operation 719 is determined, and if the face detection is successful, then operation 433 of FIG. 4 is performed. If the result of the determination in operation 721 indicates that the face detection is not successful, then operation 419 of FIG. 4 is performed.

Referring to FIG. 8, if face detection in the previous frame image by the left-rotated face detection unit 217 or the left-rotated face tracking unit 317 is successful in operation 427 or 437 of FIG. 4, the second image of the current frame image is provided to the left-rotated face tracking unit 317 and face detection is performed in operation 811. In operation 813, whether or not face detection in the second image of the current frame image by the left-rotated face tracking unit 317 is successful is determined. If the determination in operation 813 indicates, the face detection is successful, operation 433 of FIG. 4 is performed. Meanwhile, if the result of the determination in operation 813 indicates that the face detection is not successful, the second image of the current frame image is provided to the first frontal face tracking unit 311 and face detection is performed in operation 815. In operation 817, whether or not the face detection in the second image of the current frame image by the first frontal face tracking unit 311 is successful is determined. If the face detection is successful, operation 433 of FIG. 4 is performed, and if the face detection is unsuccessful, operation 419 of FIG. 4 is performed.

Figure 9:
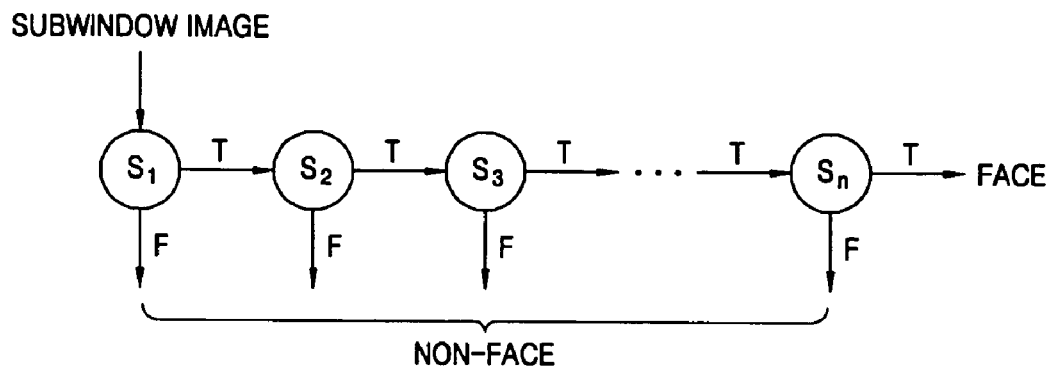
FIG. 9 is a diagram explaining a cascade face detection process applied to an embodiment of the present invention.

FIG. 9 is a diagram showing the structure of the respective face detection units 211, 213, 215, and 217 of the face detection module 130 and the respective face tracking units 311, 313, 315 and 317 of the face tracking module 140. The structure of each of the detection units 211, 213, 215 and 217 and the tracking units 311, 313, 315, and 317 is formed with n stages ($S_1$ through $S_n$) connected in the form of a cascade. Here, each stage ($S_1$ through $S_n$) performs face detection using classifiers based on simple features and in this structure, the number of classifiers used in a stage increases as a distance from the first stage increases. For example, the first stage ($S_1$) uses 4 to 5 classifiers, and the second stage ($S_2$) uses 15 to 20 classifiers.

Each stage is formed as the weighted sum of a plurality of classifiers, and whether or not a face is detected is determined according to the sign of the weighted sum. Each stage can be expressed by the following equation 1:

$$\text{sign}\left[\sum_{m=1}^{M} c_m \cdot f_m(x)\right] \tag{1}$$

Here, $c_m$ denotes the weight of a classifier and $f_m(x)$ denotes the output of a classifier and can be expressed by the following equation 2:

$$f_m(x) \in \{-1, 1\} \quad (2)$$

That is, each classifier is formed with a simple feature and a threshold and outputs −1 or 1.

Referring to FIG. 9, the first stage ($S_1$) receives the k-th subwindow image of the first image or the second image as an input and performs face detection. If the face detection fails (F), it is determined that the k-th subwindow image is a non-face, and if the face detection is successful (T), the k-th subwindow image is provided to the second stage ($S_2$). In the last stage forming each face detection unit 211, 213, 215 and 217 or each face tracking unit 311, 313, 315 and 317, if face detection in the k-th subwindow image is successful (T), the k-th subwindow image is determined as a face. The selection of each classifier and weight is determined by using an Adaboost-based learning algorithm. According to the Adaboost algorithm, very efficient classifiers are generated by selecting some important visual characteristics from a large-sized feature set. The Adaboost algorithm is explained in detail in an article by Yoav Freund and Robert E. Schapire, "A Decision-Theoretic Generalization of On-line Learning and an Application to Boosting", In Computational Learning Theory: Eurocolt '95, pp. 23-37, Springer-Verlag, 1995. Briefly, in the Adaboost algorithm, N training samples are defined based on face images and non-face images. Then sample weights $w_i$ of the N training samples are initialized to 1/N. Next, $f_m(x)$ corresponding to a classifier, $c_m$ corresponding to a weight of a classifier and sample weights $w_i$ are found over M times. Then a stage obtained by combining M classifiers and M weights corresponding to each classifier is provided as an output.

According to this stage structure connected in the form of a cascade as shown in FIG. 9, a non-face can be determined even with a small number of simple features, and is rejected in the initial stage such as the first or second stage. Accordingly, the entire processing speed for face detection can be improved.

Figure 10A:
FIGS. 10A through 10C are showing examples of simple features applied to the present invention and FIGS. 10D and 10E are diagrams showing face image examples to which simple features are applied.
Figure 10B:
Figure 10C:

FIGS. 10A through 10C are showing examples of simple features used in respective classifiers. FIG. 10A shows an edge simple feature, FIG. 10B shows a line simple feature, and FIG. 10C shows a center-surround simple feature. Each simple feature is formed with 2 or 3 white or black rectangles. According to the simple feature, each classifier subtracts the sum of gradation values of pixels located in a white rectangle from the sum of gradation values of pixels in a black rectangle, and compares the result of the subtraction with a threshold corresponding to the simple feature. According to the result of the comparison of the subtraction result with the threshold, the classifier outputs 1 or −1.

Figure 10D:
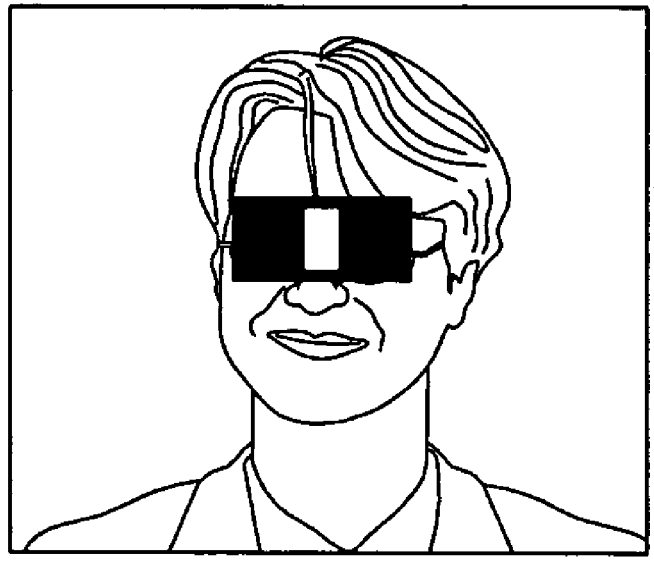
Figure 10E:
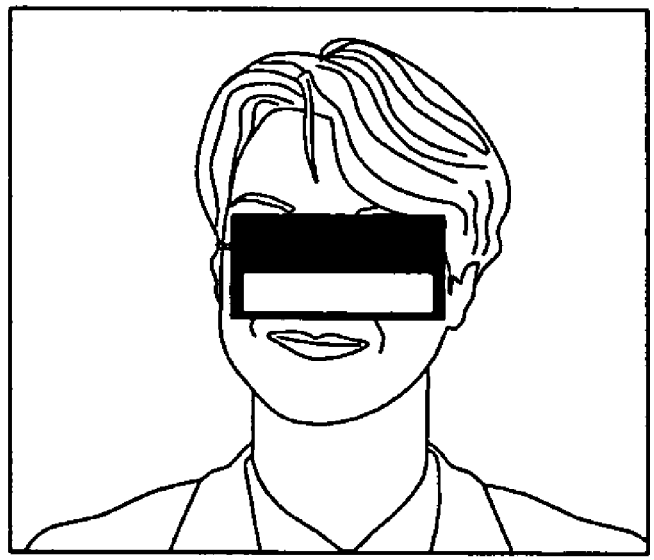

FIG. 10D shows an example of detecting the eye part in a face by using a line simple feature formed with one white rectangle and two black rectangles. Considering that the eye area is darker than the ridge area of a nose, the gradation value difference between the eye area and the nose ridge area is measured. FIG. 10E shows an example of detecting the eye part in a face by using an edge simple feature formed with one white rectangle and one black rectangle. Considering that the eye area is darker than the cheek area, the gradation value difference between the eye area and the cheek area is measured. These simple features to detect a face can have a variety of forms.

Figure 11A:
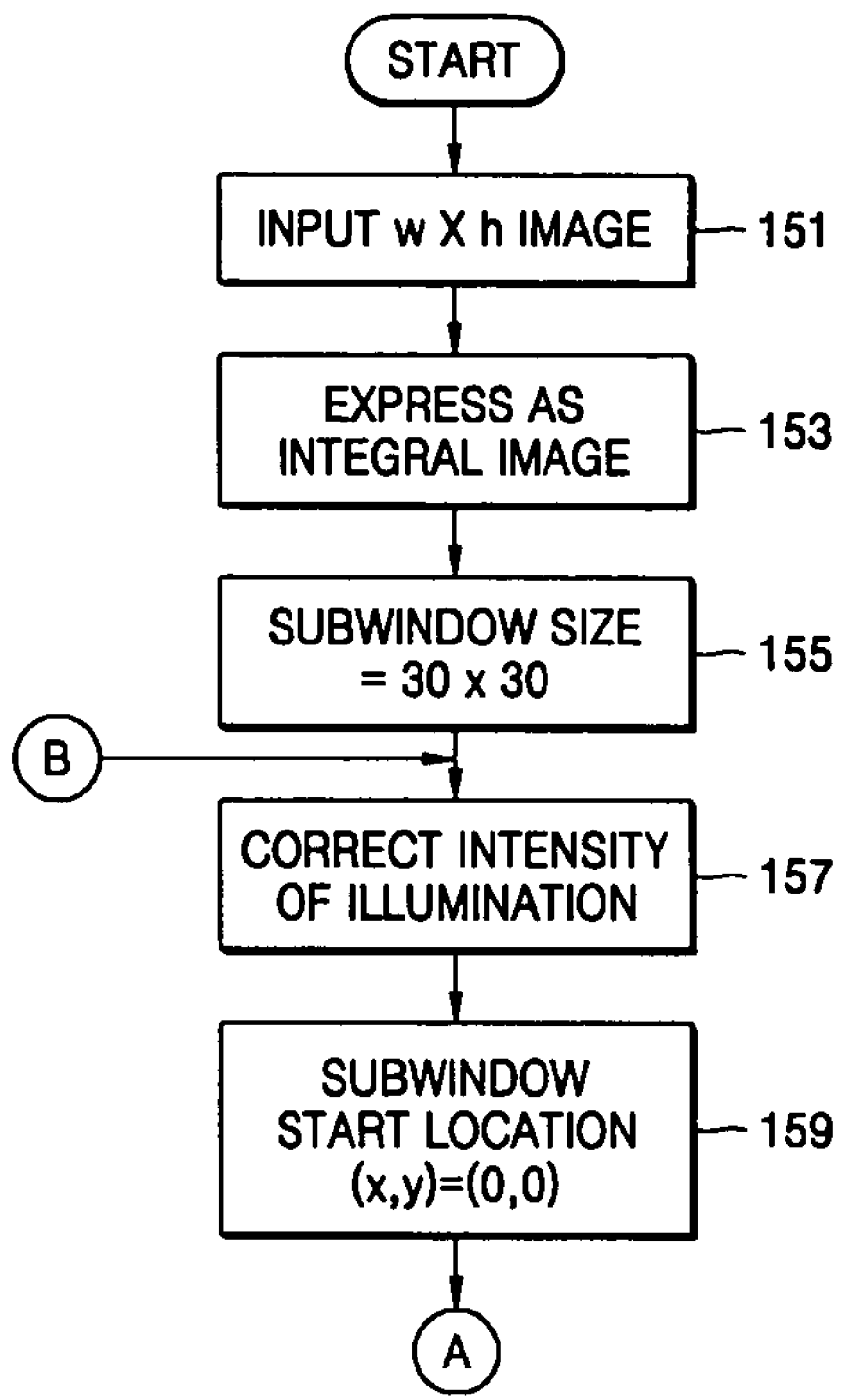
FIGS. 11A and 11B are flowcharts explaining methods of detecting a face in operations 417 and 431 of FIG. 4.
Figure 11B:
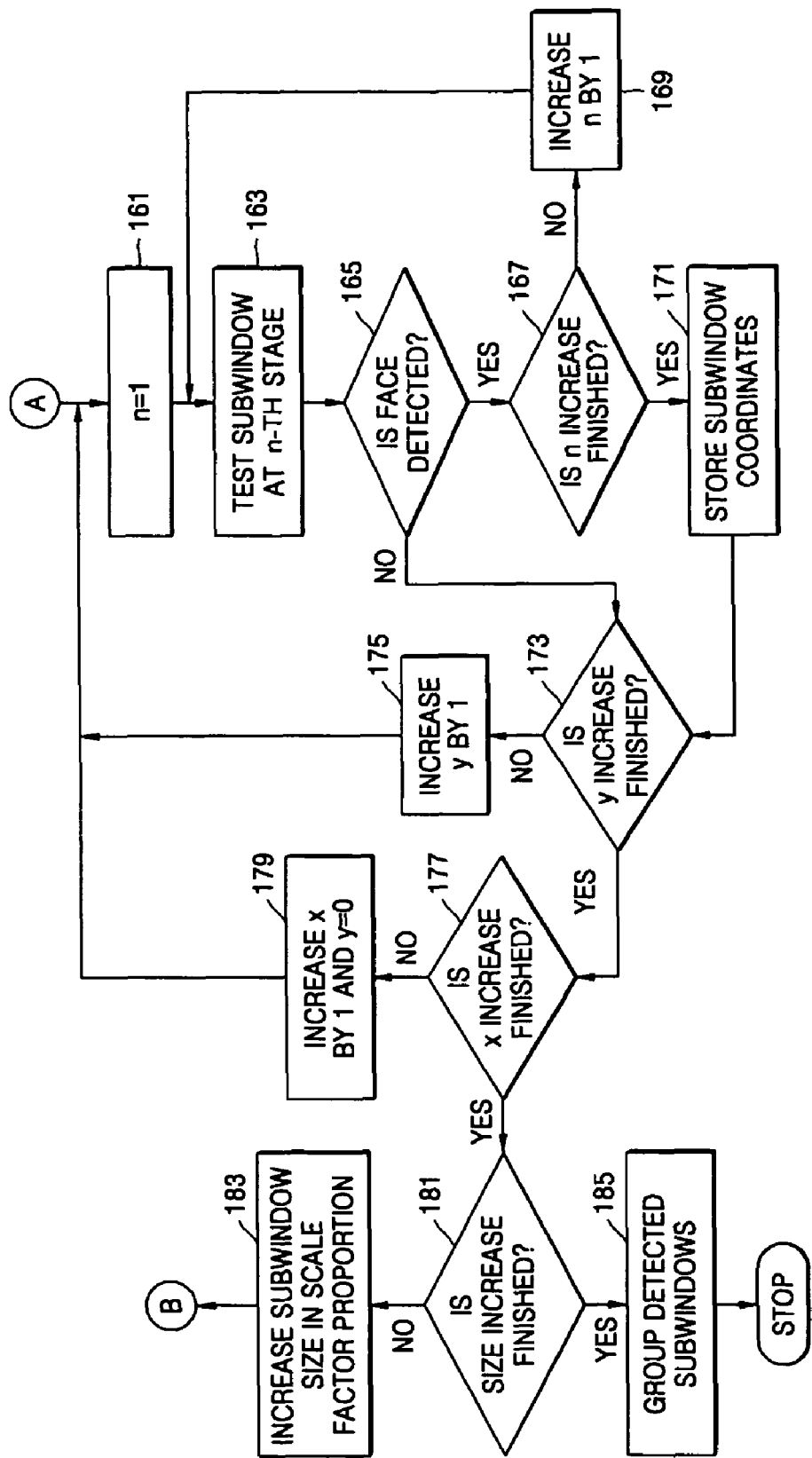

FIGS. 11A and 11B are flowcharts explaining methods of detecting a face in operations 417 and 431 of FIG. 4.

Referring to FIGS. 11A and 11B, an image of (w×h) pixels is input into either the face detection module 130 or the face tracking module 140 in operation 151. The input image may be a first image that is the whole frame image and a second image obtained by restricting a whole frame image to a predetermined size in the image clipping unit 135. In operation 153, the first image or the second image is expressed as an integral image that is in a form easy to extract the simple features shown in FIGS. 10A through 10C. The integral image expression method is explained in detail in an article by Paul Viola, "Rapid Object Detection using a Boosted Cascade of Simple Features", Proceeding of IEEE Conference on Computer Vision and Pattern Recognition, vol. 1, pp. 511-518, 2001.

In operation 155, a minimum size of a subwindow image is set, and here, an example of 30×30 pixels will be explained. In operation 157, illumination correction for a subwindow image is performed. Illumination correction is performed by subtracting a mean illumination value of one subwindow image from the gray scale value of each pixel, and dividing the result of the subtraction by a standard deviation. In operation 159, the location (x,y) of a subwindow image is set to (0,0), which is the start location.

In operation 161, the number (n) of a stage is set to 1, and in operation 163, by testing a subwindow image in an n-th stage, face detection is performed. In operation 165, it is determined whether or not a face is detected in the n-th stage. Operation 173 is performed in order to change the location or size of the subwindow image when no face is detected. If the result of the determination in operation 165 indicates that the face detection is successful, it is determined in operation 167 whether or not the n-th stage is the last stage in one face detection unit in the face detection module. If the result of the determination in operation 167 indicates that the n-th stage is not the last one, n is increased by 1 in operation 169 and then, operation 163 is performed again. Meanwhile, if the result of the determination in operation 167 indicates that the n-th stage is the last one, the coordinates of the subwindow image are stored in operation 171.

In operation 173, it is determined whether y corresponds to h of the first image or the second image, that is, whether or not the increase of y is finished. If the result of the determination in operation 173 indicates that the increase of y is finished, it is determined in operation 177 whether x corresponds to w of the first image or the second image, that is, whether or not the increase of x is finished. Meanwhile, if the result of the determination in operation 173 indicates that the increase of y is not finished, y is increased by 1 in operation 175 and then operation 161 is performed again. If the result of the determination in operation 177 indicates that the increase of x is finished, operation 181 is performed and if the increase of x is not finished, x is increased by 1 with no change in y in operation 179, and then operation 161 is performed again.

In operation 181, it is determined whether or not the increase of the size of the subwindow image is finished. If the result of the determination indicates that the increase of the size of the subwindow image is not finished, the size of the subwindow image is increased proportionally by a predetermined scale factor in operation 183, and then operation 157 is performed again. Meanwhile, if the result of the determination in operation 181 indicates that the increase of the size of the subwindow image is finished, the coordinates of the respective subwindow images in which a face stored in operation 171 is detected are grouped in operation 185.

In a method to improve the detection speed in the face detection method according to an embodiment of the present invention, the total number of subwindow images detected as a face in a whole frame image, that is, in one first image, input to the face detection module 130 may be restricted. Also, the total number of subwindow images detected as a face in an image obtained by restricting the size of a whole frame image input to the face tracking module 140, that is, in one second image, may be restricted, or the minimum size of a subwindow image may be restricted to (the size of a face detected in the previous frame image—(n×n) pixels), or the size of the second image may be restricted to a predetermined multiple, for example, two, of the box coordinates of the location of a face detected in the previous frame image.

Figure 12A:
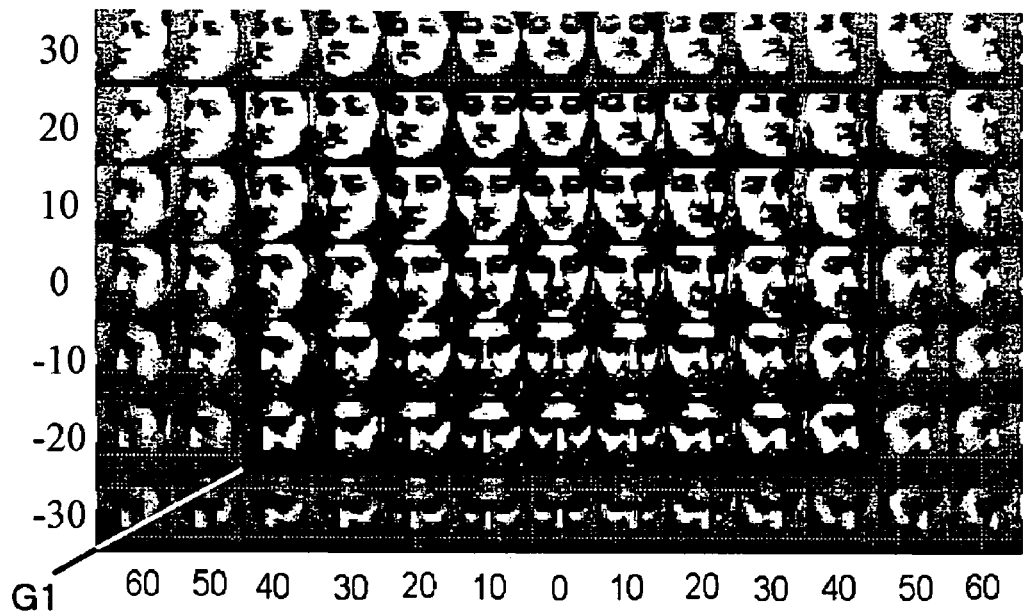
FIGS. 12A through 12C are diagrams showing the performance of a face detection method according to an embodiment of the present invention.
Figure 12B:
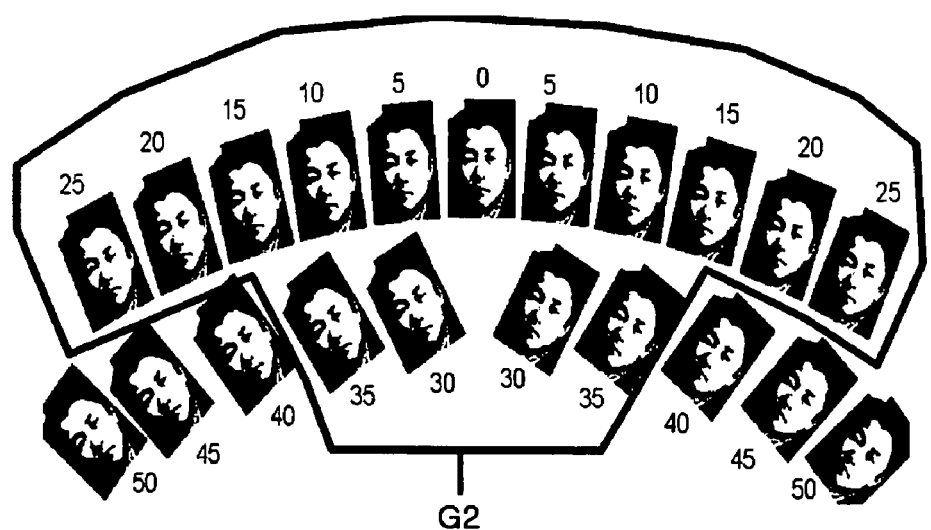
Figure 12C:
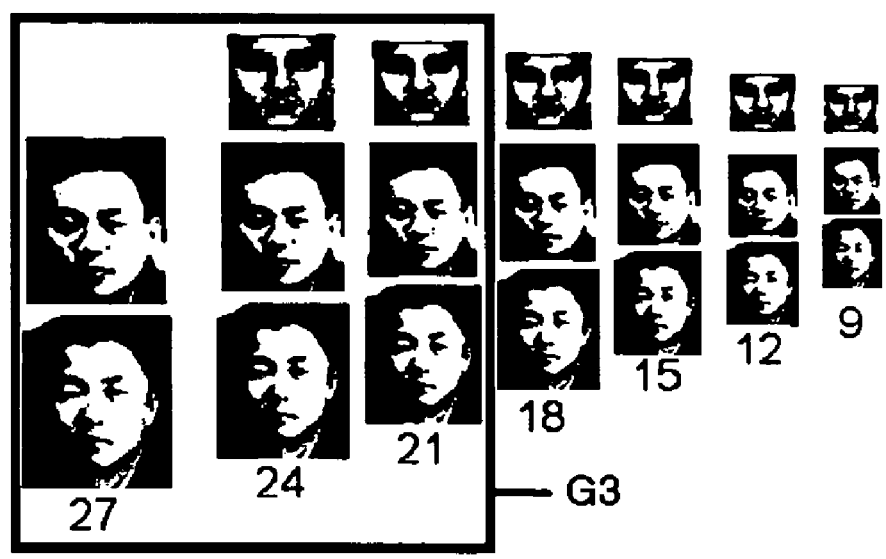

Next, the result of simulations evaluating the performance of the face detection method according to an embodiment of the present invention will now be explained with reference to FIGS. 12A through 12C. Here, the experiment environment is a 1.5 GHz PC environment equipped with a camera and a frame grabber. According to the experiment, the detection speed of 30 frames per second could be achieved. The group (G1) of FIG. 12A in which face detection was successful shows that when the rotation angle is 25° in the left-rotated face detection unit 217 and the right-rotated face detection unit 213, the angle of a face that can be detected is ±20° in x-axis (that is, upward and downward rotation angles) and ±40° in y-axis (that is, the angles of left rotation and right rotation). The group (G2) of FIG. 12B in which face detection was successful shows that the angle of a face that can be detected is ±35° in z-axis.

Accordingly, the respective angles were greatly improved compared to the conventional methods. In addition, FIG. 12C shows that the minimum distance between eyes which can be detected is 20 pixels. Meanwhile, the face detection rate was 92.3% for Carnegie Mellon University (CMU) Frontal Face Images database (DB), and at this time, allowable illumination for detection was 10 to 13,000 lx. Accordingly, it can be seen that the face could be detected accurately irrespective of illumination change.

Figure 13:
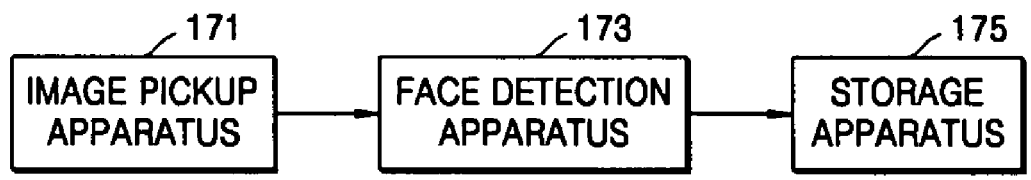
FIG. 13 is a block diagram showing the structure of a preferred embodiment of a security monitoring system according to an embodiment of the present invention.

FIG. 13 is a block diagram showing the structure of an embodiment of a security monitoring system according to the present invention. The security monitoring system includes an image pickup apparatus 171, a face detection apparatus 173, and a storage apparatus 175.

Referring to FIG. 13, the image pickup apparatus 171 takes an image of an object and converts the image into a gray scale image. The face detection apparatus 173 detects a face in units of frames from the gray scale images provided by the image pickup apparatus 171. Here, if a face is not detected in the previous frame image provided by the image pickup apparatus 171, the face detection apparatus 173 selects one of N face detection modes, where N is an integer equal to or greater than 2 and detects a face in a current frame image, and if a face is detected in the previous frame image, detects a face by performing sequentially at least one or more of N face tracking modes in the current frame image. The detailed structure and operation of the face detection apparatus 173 are the same as described above with respect to FIGS. 1-3.

The storage apparatus 175 stores face images detected in the face detection apparatus 173 in units of frames.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to the embodiments of the present invention as described above, each of the face detection module and the face tracking module is built so that face detection for a frontal face, a right-rotated face and a left-rotated face is enabled. By doing so, the face can be easily detected even though part of the face is covered by a hand, a mask or sunglasses, or the angle of rotation of the face is large. In addition, when a face is not detected in the previous frame image, the current frame image is provided to the face detection module, and when a face is detected in the previous frame image, the current frame image is provided to the face tracking module. Accordingly, the processing speed increases while face detection is performed accurately. Furthermore, when a face is detected in the previous frame image, the current frame image is provided to the face tracking unit corresponding to the face detection unit, and then, by performing face detection in at least one or more face tracking units, the face can be accurately detected. Also, by using the stage structure connected in the form of a cascade and classifiers using simple features, face detection can be performed at a high speed.

The present invention can be used as a prerequisite operation for the fields requiring face recognition, such as credit cards, cash cards, electronic resident registration cards, and other cards requiring confirmation of identification, terminal access control, public place monitoring systems, electronic photo albums, and criminal photo recognition, and can be applied usefully to a security monitoring system in particular.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A face detection method, comprising:
   determining whether a face is detected in a previous frame image;
   if the face is not detected in the previous frame image, detecting the face in a first image according to one detection mode selected from N face detection modes, where N is an integer equal to or greater than 2; and
   if the face is detected in the previous frame image, detecting the face by performing sequentially at least one tracking mode of N face tracking modes with a second image,
   wherein the face detection modes comprise a frontal face detection mode, a right-rotated face detection mode, and a left-rotated face detection mode,
   the face tracking modes comprise a frontal face tracking mode, a right-rotated face tracking mode, and a left-rotated face tracking mode, and
   detecting the face in the first image comprises dividing a number of previous frames in which the face is not detected by N and selecting one among the N face detection modes according to a remainder of the dividing and performing face detection according to the selected face detection mode.

2. The method of claim 1, wherein the first image is a current frame image and the second image comprises restricting the current frame image to a predetermined size in consideration of a size of the face detected in the previous frame image.

3. The method of claim 1, wherein the frontal face detection mode comprises a first frontal face detection mode and a second frontal face detection mode that has a lower accuracy but faster processing speed than the first frontal face detection mode.

4. The method of claim 1, wherein the frontal face tracking mode comprises a first frontal face tracking mode and a second frontal face tracking mode that has a lower accuracy but faster processing speed than the first frontal face tracking mode.

5. The method of claim 1, wherein the detecting the face comprises using a stage structure connected in the form of a cascade, and each stage is formed with a plurality of classifiers corresponding to one simple feature.

6. The method of claim 5, further comprising determining whether the face is detected according to a sum of weights of the plurality of classifiers forming one stage in each stage.

7. The method of claim 1, wherein the detecting the face comprises increasing subwindow images of the first and second images gradually from a minimum size to a maximum size and scanning each subwindow image against a current frame image to detect the face.

8. The method of claim 7, wherein the increasing the subwindow images comprises restricting a number the subwindow images detected as the face in the current frame image to a predetermined number.

9. The method of claim 7, wherein the increasing the subwindow images comprises restricting the minimum size of the subwindow image by a predetermined size less than a size of the face detected in the previous frame image.

10. The method of claim 7, wherein the increasing the subwindow images when the face is detected in the previous frame image, comprises restricting a scanning area using the subwindow image to predetermined multiples of box coordinates of a location of the face detected in the previous frame image.

11. A face detection method, comprising:
determining whether a face is detected in a previous frame image;
if the face is not detected in the previous frame image, detecting the face in a first image according to one detection mode selected from N face detection modes, where N is an integer equal to or greater than 2; and
if the face is detected in the previous frame image, detecting the face by performing sequentially at least one tracking mode of N face tracking modes with a second image,
wherein the face detection modes comprise a frontal face detection mode, a right-rotated face detection mode, and a left-rotated face detection mode,
the face tracking modes comprise a frontal face tracking mode, a right-rotated face tracking mode, and a left-rotated face tracking mode,
detecting the face in the second image comprises performing the face tracking mode corresponding to the selected face detection mode or the at least one tracking mode in which the face is detected in the previous frame image, and
detecting the face when the face is detected in the previous frame image comprises if the face is detected in the previous frame image by the frontal face detection mode or one of the tracking modes, and if face detection in the second image fails in the frontal face tracking mode, the right-rotated face tracking mode and the left-rotated face tracking mode are additionally performed.

12. A face detection method, comprising:
determining whether a face is detected in a previous frame image;
if the face is not detected in the previous frame image, detecting the face in a first image according to one detection mode selected from N face detection modes, where N is an integer equal to or greater than 2; and
if the face is detected in the previous frame image, detecting the face by performing sequentially at least one tracking mode of N face tracking modes with a second image,
wherein the face detection modes comprise a frontal face detection mode, a right-rotated face detection mode, and a left-rotated face detection mode,
the face tracking modes comprise a frontal face tracking mode, a right-rotated face tracking mode, and a left-rotated face tracking mode,
detecting the face in the second image comprises performing the face tracking mode corresponding to the selected face detection mode or the at least one tracking mode in which the face is detected in the previous frame image, and
detecting the face when the face is detected in the previous frame image comprises if the face is detected in the previous frame image by the right-rotated face detection mode or the right-rotated face tracking mode, and if face detection in the second image fails in the right-rotated face tracking mode, the frontal face tracking mode is additionally performed.

13. A face detection method, comprising:
determining whether a face is detected in a previous frame image;
if the face is not detected in the previous frame image, detecting the face in a first image according to one detection mode selected from N face detection modes, where N is an integer equal to or greater than 2; and
if the face is detected in the previous frame image, detecting the face by performing sequentially at least one tracking mode of N face tracking modes with a second image,
wherein the face detection modes comprise a frontal face detection mode, a right-rotated face detection mode, and a left-rotated face detection mode,
the face tracking modes comprise a frontal face tracking mode, a right-rotated face tracking mode, and a left-rotated face tracking mode,
detecting the face in the second image comprises performing the face tracking mode corresponding to the selected face detection mode or the at least one tracking mode in which the face is detected in the previous frame image, and
detecting the face when the face is detected in the previous frame image comprises if the face is detected in the previous frame image by the left-rotated face detection mode or the left-rotated face tracking mode, and if face detection in the second image fails in the left-rotated face tracking mode, the frontal face tracking mode is additionally performed.

14. A non-transitory computer readable recording medium having embodied thereon a computer program for a face detection method, comprising:
determining whether a face is detected in a previous frame image;
if the face is not detected in the previous frame image, detecting the face in a first image according to one detection mode selected from N face detection modes, where N is an integer equal to or greater than 2; and if the face is detected in the previous frame image, detecting the face by performing sequentially at least one tracking mode of N face tracking modes with a second image, wherein the face detection modes comprise a frontal face detection mode, a right-rotated face detection mode, and a left-rotated face detection mode, and the face tracking modes comprise a frontal face tracking mode, a right-rotated face tracking mode, and a left-rotated face tracking mode, and detecting the face in the first image comprises dividing a number of previous frames in which the face is not detected by N and selecting one among the N face detection modes according to a remainder of the dividing and performing face detection according to the selected face detection mode.

15. A face detection apparatus, comprising:

a face detection module which detects a face by selectively performing one of N face detection modes, where N is an integer equal to or greater than 2 on a first image;

a face tracking module which detects a face by sequentially performing at least one of N face tracking modes with a second image;

a determination unit which receives the output of the face detection module or the output of the face tracking module as an input and determines whether the face is detected in the first or second image; and a switching unit which provides the first image to the face detection module if the face is not detected in the previous image and the second image to the face tracking module if the face is detected in the previous image, wherein the face tracking module comprises a frontal face tracking unit which performs frontal face detection with the second image obtained by restricting a current frame image to a predetermined size;

a right-rotated face tracking unit which rotates the second image obtained by restricting the current frame image to a predetermined size, to the right by a predetermined angle, and then performs face detection; and a left-rotated face tracking unit which rotates the second image obtained by restricting the current frame image to a predetermined size, to the left by a predetermined angle, and then performs face detection, wherein a number of frames in which the face is not detected previously is divided by N and according to a remainder, any one of the N face detection modes is selected and face detection is performed by the face detection module according to the selected face detection mode.

16. The apparatus of claim 15, wherein the first image is a current frame image and the second image is obtained by restricting the current frame image to a predetermined size in consideration of a size of the face detected in the first or second frame image.

17. The apparatus of claim 15, wherein the face detection module comprises:

a frontal face detection unit which performs frontal face detection in a current frame image;

a right-rotated face detection unit which rotates the current frame image to the right by a predetermined angle and then performs face detection; and a left-rotated face detection unit which rotates the current frame image to the left by a predetermined angle and then performs face detection.

18. The apparatus of claim 17, wherein the frontal face detection unit operates in a first frontal face detection mode and a second frontal face detection mode that has a lower accuracy but a faster processing speed than the first frontal face detection mode.

19. The apparatus of claim 15, wherein the frontal face tracking unit operates in a first frontal face tracking mode and a second frontal face tracking mode that has a lower accuracy but a faster processing speed than the first frontal face tracking mode.

20. The apparatus of claim 15, wherein, if the face is detected in the second image by the face tracking module, face detection in a current frame image is performed according to the face tracking mode corresponding to the face detection mode or the face tracking mode in which the face is detected.

21. The apparatus of claim 15, wherein the face detection module and the face tracking module comprise, a stage structure connected in the form of a cascade, and each stage is formed with a plurality of classifiers corresponding to one simple feature.

22. The apparatus of claim 21, wherein whether a face is detected is determined by the determination unit according to a sum of weights of the plurality of classifiers forming one stage in each stage.

23. The apparatus of claim 15, wherein face detection in both the face detection module an the face tracking module is performed by gradually increasing subwindow images from a minimum size to a maximum size and scanning each subwindow image against the current frame image to detect the face.

24. The apparatus of claim 23, wherein the number of subwindow images detected as the face in the scanning each subwindow against the current frame image is restricted to a predetermined number.

25. The apparatus of claim 23, wherein the minimum size of the subwindow image in the face tracking module is restricted by a predetermined size less than a size of the face detected in the first or second image.

26. The apparatus of claim 23, wherein a scanning area using the subwindow image is restricted to predetermined multiples of box coordinates of a location of the face detected in the first or second image.

* * * * *

UNITED STATES PATENT AND TRADEMARK OFFICE
CERTIFICATE OF CORRECTION

PATENT NO. : 7,773,781 B2  Page 1 of 1
APPLICATION NO. : 10/972381
DATED : August 10, 2010
INVENTOR(S) : Jungbae Kim It is certified that error appears in the above-identified patent and that said Letters Patent is hereby corrected as shown below:

Column 16, Line 40 delete "an the" and insert -- and the --, therefor.

Signed and Sealed this

Twenty-eighth Day of December, 2010

David J. Kappos
*Director of the United States Patent and Trademark Office*